May 9, 1944.　　　　　R. FINK　　　　　2,348,209
GUN TURRET
Filed Aug. 6, 1941　　　　　2 Sheets-Sheet 1

INVENTOR
RANDOLPH FINK
BY Edgar H. Snodgrass
and Wade Krouty
ATTORNEYS

May 9, 1944.  R. FINK  2,348,209
GUN TURRET
Filed Aug. 6, 1941   2 Sheets-Sheet 2

INVENTOR
RANDOLPH FINK
BY
ATTORNEYS

Patented May 9, 1944

2,348,209

UNITED STATES PATENT OFFICE 2,348,209

GUN TURRET

Rudolph Fink, Dayton, Ohio

Application August 6, 1941, Serial No. 405,674

7 Claims. (Cl. 89—37.5)

(Granted under the act of March 3, 1883, as amended April 30, 1928; 370 O. G. 757)

The invention described herein may be manufactured and used by or for Government for governmental purposes, without the payment to me of any royalty thereon.

This invention relates to an improvement in gun turrets and more particularly to a turret of the type in which the gun is mounted in a wall or other relatively flat surface for pivotal movement in all directions. The turret is provided with shielding plates which normally lie in the plane of the wall but which are swung out of the plane thereof when the gun is swung from side to side so as to enable a wide angle of fire for the gun and a wide and unobstructed field of view for the gunner.

My invention is designed primarily for use on large aircraft where it is desirable to mount guns at various positions in the fuselage so as to protect the airplane from attack in all directions. In the prior art devices it has been customary to provide a turret in the form of a blister or a bulbiform structure extending from the wall of the fuselage, this being considered necessary in order to provide a wide angle of fire for the gun and a wide field of view for the gunner. These blisters, however, have the disadvantage of interfering with the smooth flow of air along the sides of the fuselage and also in exposing the gunner to the fire of enemy aircraft. With my improved form of turret, however, the shielding plates thereof lie normally in the plane of the fuselage wall and, therefore, offer no obstruction to the flow of air along the fuselage. When the gun is swung in a fore and aft direction, the shielding plates move therewith but are so arranged as to maintain a tight seal of the fuselage wall against the entry of the high velocity air from the slip stream. At the same time the gunner remains within the confines of the fuselage which may be armored within the vicinity of the turret so as to protect him from enemy gunfire.

One of the objects of my invention is, therefore, to provide a turret for mounting a gun in a wall while at the same time rendering possible a wide angle of fire and a clear and unobstructed field of view in all directions.

A further object of my invention is to provide an improved gun turret for use on aircraft which does not interfere with the smooth flow of air over the surface of the craft. This is accomplished by arranging the shielding plates to normally lie within the contour of the surface in which the gun is mounted so as to cause no unnecessary interference with the streamlining of the plane.

A further object of my invention is to provide a turret for use on aircraft in which the gunner's position is within the confines of a normal airplane structure, thus greatly facilitating the protection of the gunner by the use of armor plate. This is done without sacrificing in any way his clear field of vision in all directions.

Still a further object of my invention is to provide a gun turret which is simple in design and easily constructed while, at the same time, possessing all of the desirable features pointed out above and in the description which follows.

A preferred embodiment of the present invention will be hereinafter described with reference to the accompanying drawings given primarily by way of example in which.

Figure 1:
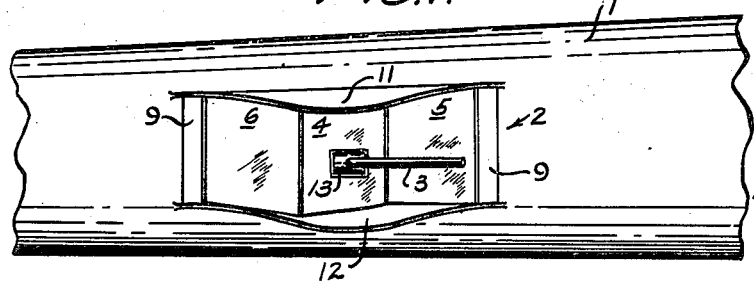
Figure 1 is a general view of my improved form of turret installed in the side of an airplane fuselage.
Figure 2:
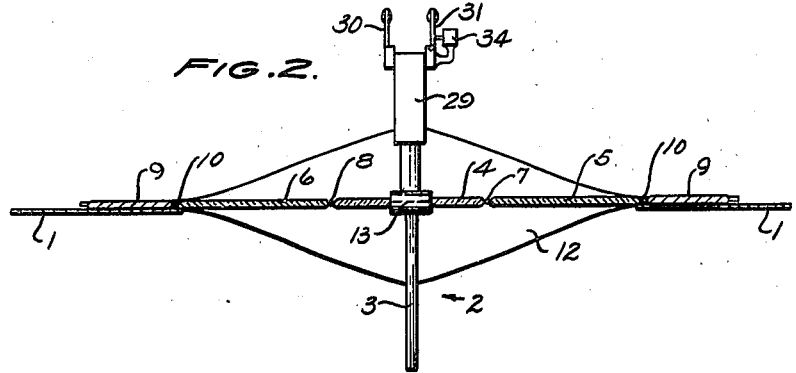
Figure 2 is a plan view of the installation shown in Figure 1, the upper sealing plate being removed and the shielding plates being shown in cross section to more clearly disclose the constructional details.
Figure 3:
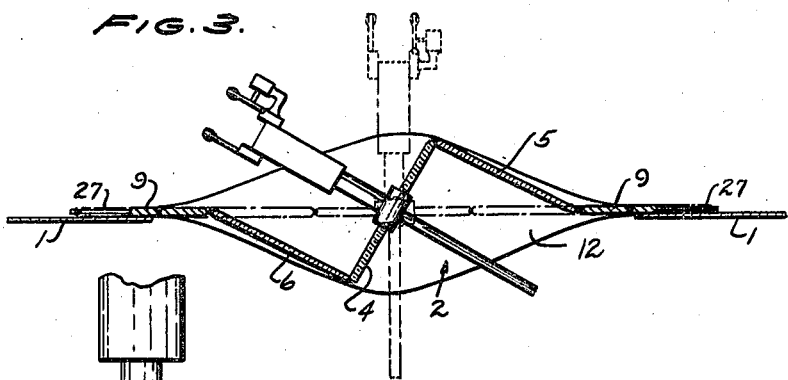
Figure 3 is a view similar to Figure 2 with the gun swung out of its normal position, the latter position being shown in dot-dash lines.

Figure 1 shows the general arrangement of my turret as mounted in the side of an airplane fuselage 1. As shown in this figure and in Figures 2 and 3, the gun, indicated generally at 2, is mounted with its barrel 3 projecting through approximately the center of a transparent plate 4. This plate is in turn pivoted in the frame of the airplane about a vertical axis passing through its center. To the opposite sides of the plate 4 are hinged the wing plates 5 and 6 by means of hinges 7 and 8. The outer ends of the wing plates are provided with pins which slide in tracks provided in the airplane frame so that when the gun is swung in a fore and aft direction, as shown in Figure 3, these pins allow the outer ends of the wing plates to slide inward toward the gun and to pivot about the pins as will be necessary when the center plate 3 is rotated. To the outer edge of each of the wing plates is fastened a sealing plate 9 by means of a hinge 10. Upper and lower sealing plates 11 and 12, lying immediately above and below the plates 4, 5 and 6 and extending at right angles from the sides of the fuselage, serve to prevent the air from the slip stream from entering the fuselage through the openings created above and below the shielding plates when the gun is moved as shown in Figure 3.

Figure 4:
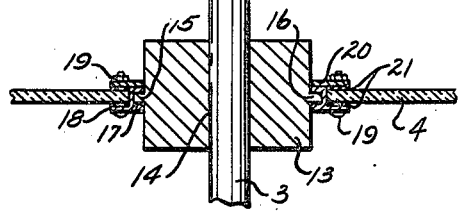
Figure 4 is a detailed view of the means for pivoting the gun about a horizontal axis so as to enable the elevation or depression of the gun. In this figure the gun is shown with the barrel partly withdrawn from its mounting cylinder.

The gun is pivoted in the center plate 4 for movement in a vertical direction by means of a cylinder 13 provided with trunnions 15 and 16. A hole 14 bored through the cylinder at right angles to the longitudinal axis thereof receives the barrel 3 of the gun. The trunnions 15 and 16 are journalled in a mounting plate 17 which is mounted in an aperture in plate 4 by means of the arrangement shown in Figure 4. As there shown the plate 17 is provided with a flanged portion 18 extending around its four sides so as to provide a bearing surface against plate 4. Bolts 19 extend through holes provided in the flanges 18 and through matching holes provided around the edges of the aperture cut in the plate 4. A back plate 20 is located on the inner side of plate 4, the bolts 19 extending through suitable holes in this plate and the assembly being then clamped securely to the center plate 4 by means of these bolts. Gaskets 21 formed of resilient material are provided between the surfaces of plates 17 and 20 and the plate 4 so as to tightly seal the joint and, in addition, to act as a shock absorbing cushion.

The center plate 4 may be made out of a transparent plastic such as Plexiglas or out of any other suitable transparent material. The wing plates 5 and 6 may be made either out of a transparent material or, if additional protection for the gunner is desired, they may be constructed of armor plate. The sealing plates 9 are preferably constructed of steel or armor plate. The upper and lower sealing plates 11 and 12 may be made of a material such as Plexiglas, if it is desired to increase the field of vision in an upward and downward direction, or these plates may be made of bullet-proof steel in order to afford greater protection to the gunner.

Figure 5:
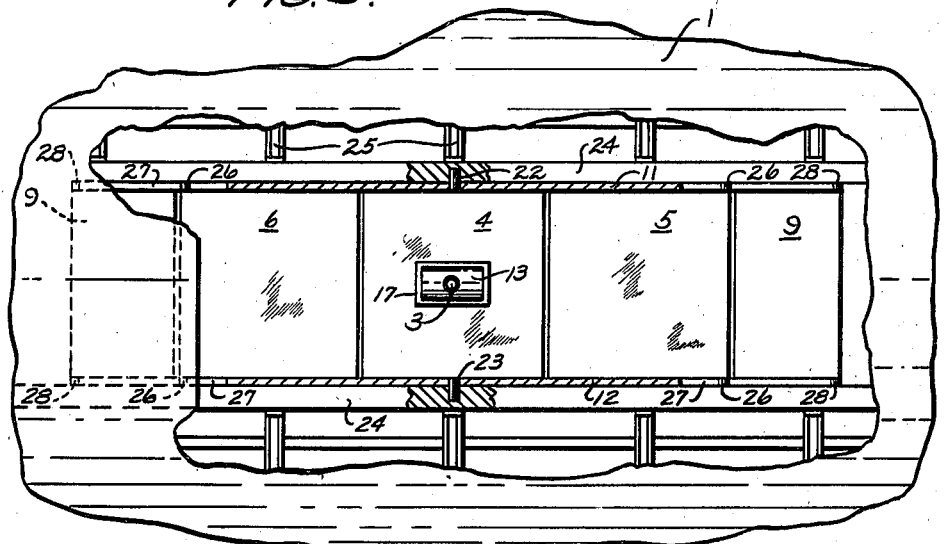
Figure 5 is a view showing the details of the installation of my turret in the wall of the airplane fuselage.

The details of the manner in which my turret is mounted in the airplane fuselage may be seen by referring to Figure 5. As there shown the center plate 4 is provided on its upper and lower edges with trunnions 22 and 23 which are journalled in holes provided in the upper and lower sealing plates 12 and 13 and in the turret-supporting frame 24. This turret-supporting frame may be secured to the bulkheads 25 of the airplane fuselage as shown in Figure 5. Each of the wing plates 5 and 6 is provided with two pins 26 sliding in slots 27 formed in the upper and lower sealing plates 12 and 13. The plates 9 are likewise supplied with pins 28 which slide in extensions of slots 27 provided within the fuselage of the airplane. These extensions may consist of channels formed in the supporting structure 24 which channels, of course, line up with the slots provided in the sealing plates so as to provide one continuous track for each of the pivot pins.

It will now be seen that when the gunner swings his gun in either a fore or aft direction the center plate 4 will swing about the trunnions 22 and 23. When the gun is moved in the vertical direction, the cylinder 13 will rotate on its trunnions 15 and 16. Thus, the gun may be moved in any desired direction. It will be seen that when the gun is swung about the trunnions 22 and 23, the center plate 4 will move with it thus affording the gunner a clear field of view no matter what the extent of this movement might be. It should also be noticed that the gunner's line of vision will always be at right angles to the plane of the plate 4 thus removing the possibility of his vision being impaired by reflections on the glass or by ripples on the surface thereof.

Figure 6:
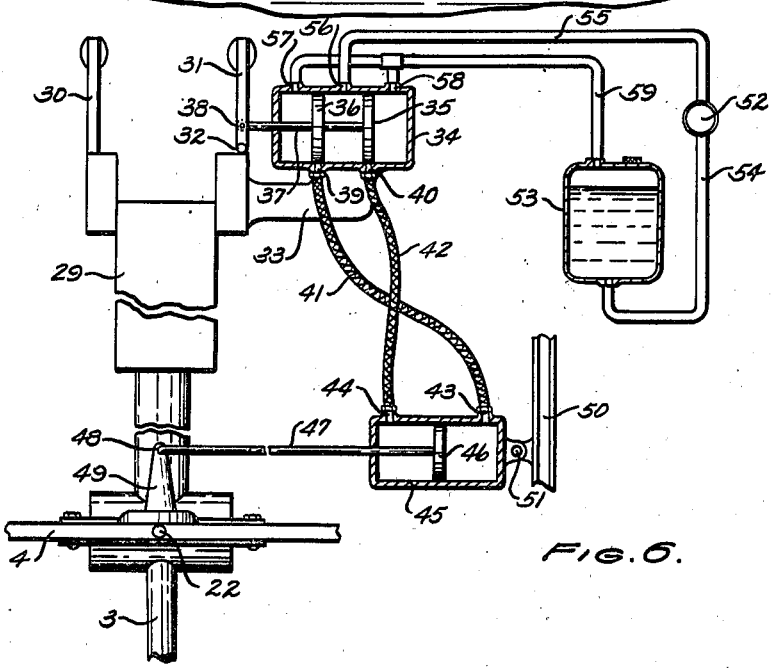
Figure 6 is a diagrammatic view showing the arrangement of a hydraulic mechanism which may be used for operating the gun through its horizontal traverse.

Since movement of the gun in a fore and aft direction will be influenced by the slip stream from the propellers, some means must be provided to overcome this factor. For this purpose a hydraulic mechanism such as that shown in Figure 6 may be provided. It will be unnecessary to provide any power means for moving the gun in a vertical direction since there will be no unbalance created by the slip stream in this respect. As shown in Figure 6 the breech of the gun 29 is provided with two trigger handles 30 and 31, the former of which is integral with the breech 29 and the latter of which is pivoted thereon at 32. A bracket 33 supported on the breech carries the frame 34 of a balanced oil valve having two pistons 35 and 36. These pistons are fastened to a rod 37 which passes through the left-hand wall of the frame 34 and is pivoted at 38 to the trigger handle 31. Two oil ports 39 and 40 are provided in the wall of the cylinder 34, these ports being connected by flexible conduits 41 and 42 with two ports 43 and 44 provided in the cylinder 45 of a hydraulic piston. The piston head 46 is attached to one end of a shaft 47 which extends through the left-hand wall of 45 and is connected at its other end, by a pivot joint 48, with an arm 49 rigidly secured to the center plate 4. The hydraulic cylinder 45 is pivotally connected at its right-hand end to an aircraft frame member 50 by means of a pivot joint 51. A pump 52 is provided to supply the hydraulic fluid under pressure to the balanced oil valve 34 which, in turn, controls the flow of the fluid to the hydraulic piston 45. An oil supply reservoir 53 is provided, the intake of the pump 52 drawing oil from the bottom of this reservoir up through a pipe 54 and then forcing this oil through a pipe 55 into the casing 34 of the oil valve through a port 56. Two oil return ports 57 and 58 are provided in the casing 34 to allow the return oil to flow through a pipe 59 into the top of the reservoir 53.

The operation of the hydraulic mechanism is as follows:

When the gunner moves the trigger handle 31 to the left in Figure 6 in order to move the barrel 3 of the gun to the right, the pistons 35 and 36 of the valve 34 will likewise be moved to the left by the rod 37. This will cause the port 39 to be uncovered and permit the pressure oil delivered to the space in between the pistons 35 and 36 by the pump 52 to flow through the tube 41 and enter the cylinder 45 on the right-hand side of the piston 46. This will, of course, cause the piston 46 and the rod 47 to move to the left thus swinging the muzzle of the gun to the right about the pivots 22 and 23. At the same time the piston 36 uncovers the port 39, the companion piston 35 will uncover the port 40 and thus permit the oil from the left-hand side of the piston 46 to flow through the tube 42 into the right-hand end of the oil valve 34 and then out through the port 58 into the discharge pipe 59.

When the gunner moves the trigger handle 31 to the right as viewed in Figure 6, the piston 35 of the oil valve will uncover the port 40 and permit the pressure oil from the pump 52 to pass through the tube 42 and into the left-hand end of the hydraulic cylinder 45. This will move the piston 46 and the rod 47 to the right and swing the muzzle of the gun to the left about the pivots of plate 4. At the same time, the piston 36 will uncover the port 39 of the oil valve and permit the oil on the right-hand side of piston 46 to flow through the tube 41 into the left-hand side of the valve casing 34 and out through the port 57 into the discharge pipe 59.

The oil supply reservoir 53 and the pump 52 are preferably mounted to move with the gun and hence the conduits 55 and 59 are shown as rigid tubing.

Hence, by a slight movement of the trigger handle 31 in a direction opposite to that in which it is desired to move the muzzle of the gun, the hydraulic system just described will cause this movement to take place with but slight effort on the part of the operator. The pressure against the barrel of the gun and against the plates 3, 4 and 5 due to the slip stream is thus overcome by a power mechanism operated under the control of the gunner. The speed with which the muzzle is moved in either direction will depend upon the extent of movement of the handle 31. If it is desired to move the gun rapidly in either direction it is only necessary to move the handle to the extreme right or left. To effect a small movement or a slow-turning movement of the gun, the handle is moved only a short distance in the appropriate direction. Vertical movements of the gun are effected by the operator's pulling down or lifting up on the trigger handles 30 and 31. Since there will be no unbalance in a vertical direction due to the slip stream of the propeller, no resistance will be encountered to these movements and, hence, no power mechanism will be necessary to aid the gunner in moving the gun in this direction.

While for purposes of illustration I have shown my gun turret positioned in the side of an aircraft fuselage, it is obvious that it could be used in various other positions in the airplane structure. My invention may also find other uses than as an aircraft turret as, for instance, in installations where it is desired that the gun be mounted in a relatively flat wall with the turret plates lying flush with the wall, but at the same time affording a wide angle of fire and a clear field of view in all directions. It is, therefore, to be understood that the form of the invention shown is for purposes of illustration only and that I intend to be limited only by the prior art and the scope of the appended claims.

What I claim as new and desire to secure by Letters Patent is:

1. A turret for pivotally mounting a gun in a wall or other substantially flat surface comprising a transparent plate of rectangular shape in which the gun is mounted, said plate normally lying in the plane of the wall or other surface and pivoted thereto about its central axis, a rectangular wing plate hinged to each of the free ends of said gun-mounting plate, and a sliding pivot joint between each of the outer ends of said wing plates and said wall whereby said gun-mounting plate may rotate about its central axis and said wing plates may pivot and slide along said wall when the gun and its mounting plate are rotated about said central axis.

2. A turret for pivotally mounting a gun in a wall or other substantially flat surface comprising a transparent plate of rectangular shape normally lying in the plane of the wall or other surface and pivoted thereto about its central axis, a gun-supporting member pivotally mounted in approximately the center of said plate for movement about an axis located at right angles to said central axis, a rectangular wing plate hinged to each of the free ends of said transparent plate, and a sliding pivot joint between each of the outer ends of said wing plates and said wall whereby transverse movement of the gun and its supporting member with respect to said central axis may cause said transparent plate to rotate about the central axis and said wing plates to pivot and slide along said wall.

3. A turret for pivotally mounting a gun in a wall or other substantially flat surface comprising a transparent plate of rectangular shape normally lying in the plane of the wall or other surface and pivoted thereto about its central axis, a gun-supporting member pivotally mounted in approximately the center of said plate for movement about an axis located at right angles to said central axis, a rectangular wing plate hinged to each of the free ends of said transparent plate, a sliding pivot joint between each of the outer ends of said wing plates and said wall, and a pair of sealing plates secured in said wall immediately above and below said transparent plate and said wing plates and located at right angles thereto, whereby transverse movement of the gun and its supporting member with respect to said central axis may cause said transparent plate to rotate about the central axis and said wing plates to pivot and slide along said wall without destroying the seal between said plates and said wall.

4. A turret for pivotally mounting a gun in a wall or other substantially flat surface comprising a transparent plate of rectangular shape normally lying in the plane of the wall or other surface and pivoted thereto about its central axis, a gun-supporting member pivotally mounted in approximately the center of said plate for movement about an axis located at right angles to said central axis, a rectangular wing plate hinged to each of the free ends of said transparent plate, a sliding pivot joint between each of the outer ends of said wing plates and said wall, a rectangular closure plate hinged to the outer ends of each of said wing plates and guided for sliding movement along said wall, and a pair of sealing plates secured in said wall immediately above and below said transparent plate and said wing plates and located at right angles thereto whereby transverse movement of the gun and its supporting member with respect to said central axis may cause said transparent plate to rotate about the central axis and said wing plates to pivot and slide, and said closure plates merely to slide along said wall without destroying the seal between said plates and said wall.

5. In a gun turret adapted for installation in any substantially flat surface of an aircraft or other vehicle without altering the contour thereof and at the same time affording a wide field of view for the gunner during firing, the combination of a substantially flat, transparent plate normally occupying a co-planar relationship with respect to the flat surface and being pivotally mounted in said vehicle for rotation about an axis located substantially within the plane of said plate, and means moving with said plate as the latter is rotated about said first-mentioned axis for supporting a gun for movement about an axis located at right angles to said first-mentioned axis.

6. In a gun turret suitable for installation in any substantially flat surface on an aircraft or other vehicle without altering the contour thereof and at the same time affording a wide and clear field of view for the gunner during firing, the combination of a substantially flat, transparent plate normally disposed in a co-planar relationship with respect to the flat surface, said plate being pivotally mounted in said vehicle for rotation about an axis lying substantially within the plane of said plate, and a gun supporting member pivotally mounted in approximately the center of said plate for movement about an axis lying at right angles to said first-mentioned axis and substantially within the plane of said plate.

7. In a gun turret adapted for installation in any substantially flat surface of an aircraft or other vehicle without altering the straight lines thereof and at the same time affording a wide and clear field of view for the gunner during firing, the combination of a substantially flat, transparent plate normally disposed in a co-planar relationship with respect to the flat surface, a gun supporting member pivotally secured to said plate in the central portion thereof for rotation about an axis lying substantially within the plane of said plate, and means for pivotally supporting said plate in said vehicle for rotation about an axis lying substantially within the plane of said plate and at right angles to said first-mentioned axis and passing through said gun supporting member.

RUDOLPH FINK.